July 20, 1926.
F. V. TISCHER
1,593,201
STEERING WHEEL
Filed Nov. 3, 1925
3 Sheets-Sheet 2
Fig.3.
Fig.4.
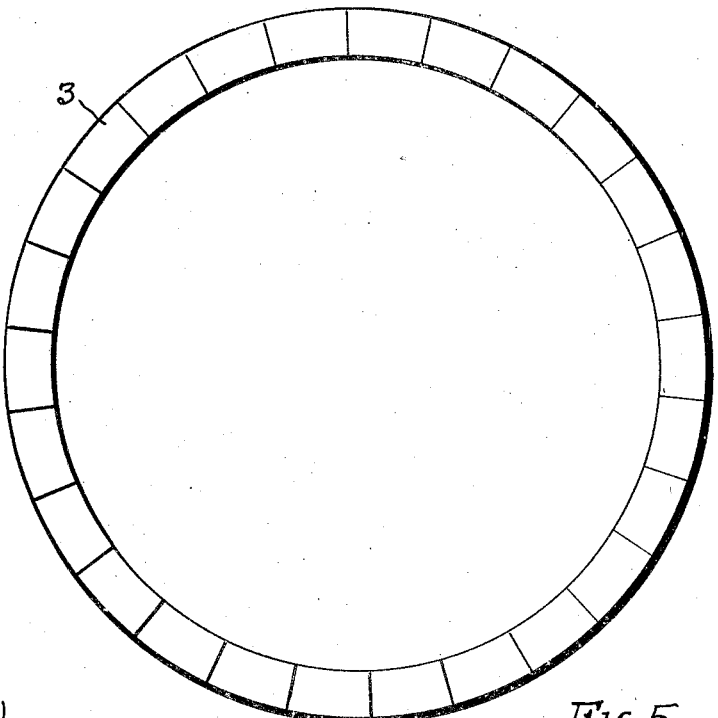
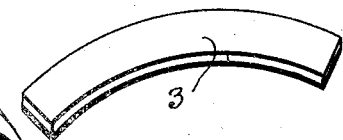
Fig.5.
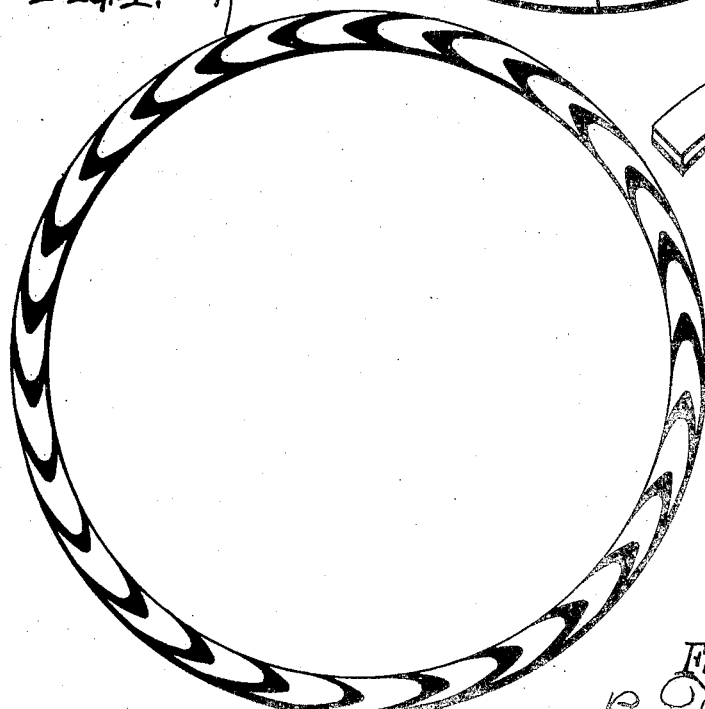
Inventor
FRANK V. TISCHER, July 20, 1926.

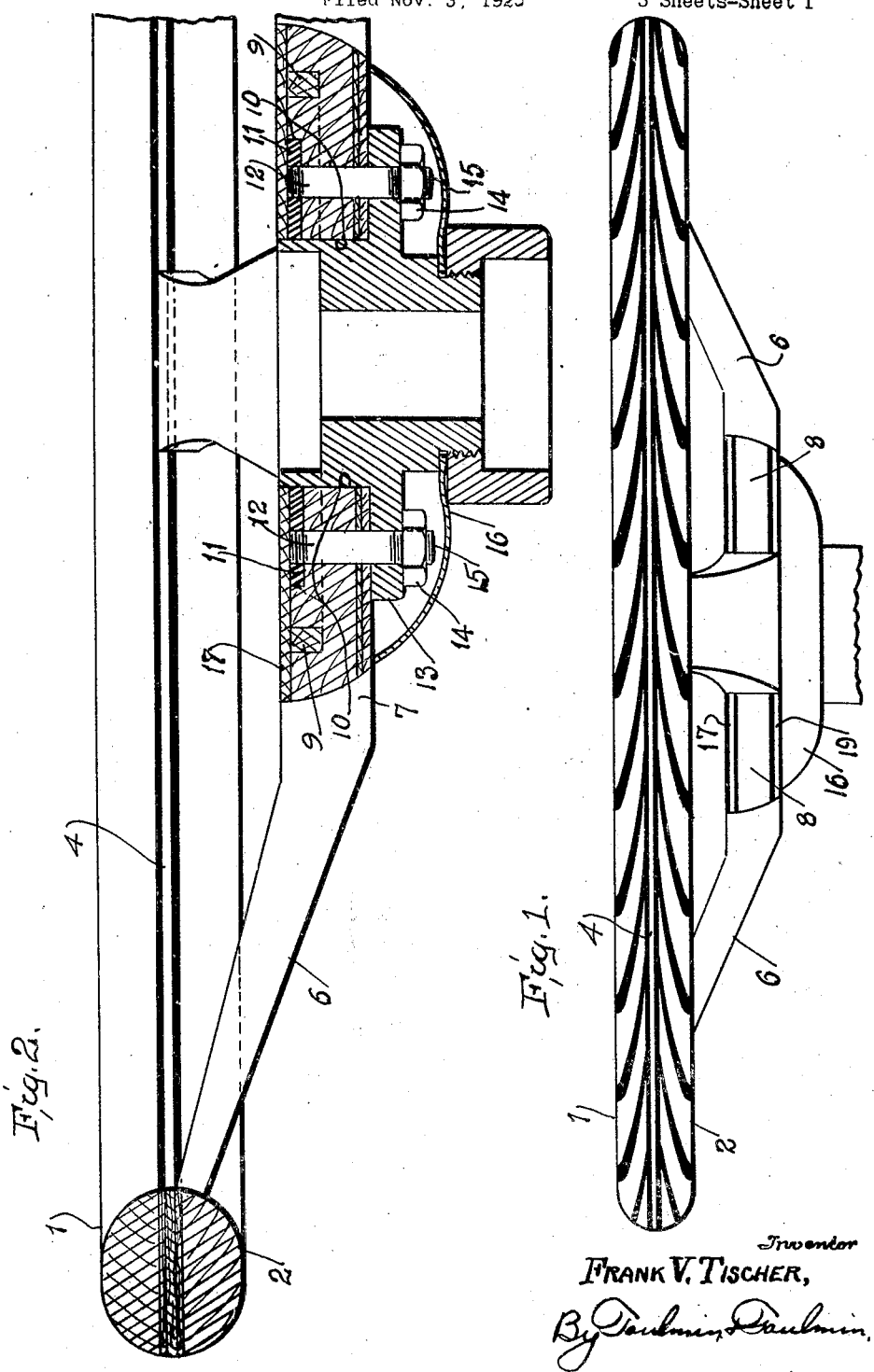

F. V. TISCHER

STEERING WHEEL

Filed Nov. 3, 1925

Inventor
FRANK V. TISCHER,
By Toulmin & Toulmin,
Attorneys

Patented July 20, 1926.

1,593,201

UNITED STATES PATENT OFFICE.

FRANK V. TISCHER, OF DAYTON, OHIO.

STEERING WHEEL.

Application filed November 3, 1925. Serial No. 66,645.

This invention relates to steering wheels. It is the object of my invention to provide a marquetry steering wheel, adapted to receive a metal bushing, which will be very strong, inexpensive to manufacture and highly ornamental; the rim having a knuckle grip so arranged as to conform to the hand of the operator, thereby preventing the hand of the operator from slipping and the fingers from being clinched.

In the accompanying drawings:—

Fig. 1 is a side elevation of a wheel embodying my invention;

Fig. 2 is a partial elevation and section illustrating the reinforcing rim and hub members;

Fig. 3 is a plan view of one of the outer rim sections built up of a plurality of segments;

Fig. 4 is a similar view after the surfaces have been planed and rounded off;

Fig. 5 is a detail view of a curved laminated segment of which the rim is built up;

Figure 6:
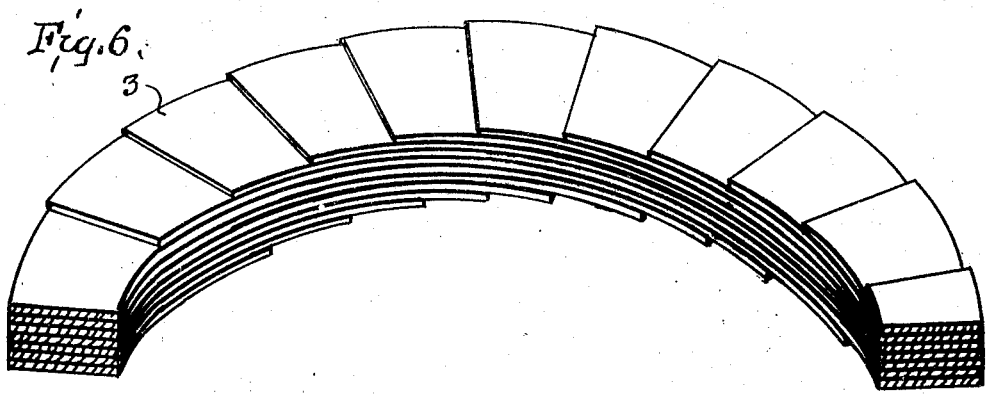
Fig. 6 is a perspective view of a portion of one of the outer rim sections built up of a plurality of laminated segments.

Referring to the drawings I will first describe the manner in which I fabricate the rim of my wheel and the novel features thereof. The rim is composed of three built-up sections, the intermediate section constituting a reinforcing member for the outer sections. The outer sections 1 and 2 are formed in the following manner. A plurality of short, flat, curved laminated segments 3 one of which is shown in Fig. 5, made up of two or more kinds of wood are laid about a circle in stepped relationship diagonally and to a given degree, after the manner illustrated in Fig. 6. For this purpose I employ a disk, not shown, having a flat metal ring with spaced prongs struck upward on the periphery to prevent the segments from slipping. Glue is then placed between the segments and another disk or "cawl" is laid upon the built-up segmental ring and placed in a standard press. After being duly pressed and dried a plan view of the built-up structure will have the appearance of the ring shown in Fig. 3, which is then planed off and turned to form a ring having the appearance of that shown in Fig. 4. Two such built-up rings comprise the outer sections 1 and 2 of the rim, the only difference being that one is made so that the grain of the wood will run at a right oblique angle and the other so that the grain of wood will run at a left oblique angle.

The intermediate section 4 of the rim constitutes a reinforcing section for the outer sections and serves to prevent any strains causing damage to one outer section from being transmitted to the other outer section. This intermediate section is made up of flat curved laminated sections, such as shown in Fig. 5, two or more different kinds of wood preferably being employed to make artistic designs. These segments are also laid about a circle, but have their ends abutting instead of stepped, and the grain of the wood running straight, the segments being held together by glue.

The outer and intermediate sections thus built up are assembled and glued together. The straight grain lines of the reinforcing member 4 running through the center of the structure and the right and left oblique grains of the outer sections 1 and 2 running in opposite directions outwardly from the intermediate section, make a composite structure that is very strong and highly ornamental.

After the composite structure has dried it is turned in a specially designed machine and a rim produced having knuckles 5 to provide an easy hand grip. The top and bottom surfaces of the rim are made true to a circle, but the knuckles are formed on the inner and outer edges in staggered relation, said knuckles extending outwardly from the circumference about one-eighth of an inch, the spaces between the knuckles being about the width of an adult's hand.

However, a rim may be composed entirely of a structure fabricated in the manner for either of the outer sections hereinbefore described or of two such outer sections, omitting the reinforcing intermediate section.

The rim thus formed is provided with mortises adapted to receive a plurality of arms 6 which are tenoned therein. These arms are curved and the inner ends 7 thereof lie in a horizontal plane parallel to the rim and are fastened together in the manner set forth in my Patent No. 1,545,989, issued July 14, 1925. The brace blocks 8, inserted between the horizontal arm portions 7, have their outer edges curved outwardly instead of inwardly, as shown in said patent, to form a circular hub to permit extension of the anchorage for the metal bushing, further removed from the bored wall of the inner ends of the arm portions 7. In order to reinforce the structure at the juncture of the brace blocks 8 and connecting arm portions 7 I provide an endless ring 9 of any suitable material, which is tightly fitted into a groove in the brace blocks and connecting arms.

Centrally of the adjoining horizontal arm portions 7 I provide an opening 10 adapted to receive a metal bushing.

A steering wheel must pass certain tests before it will be accepted and in order to make a steering wheel largely of wood which will be inexpensive and at the same time possess the necessary strength to withstand the stresses to which it is subjected has been the problem confronting manufacturers who contemplated making such wheels. I will now describe the means I have provided for making the structure so far described sufficiently strong to provide an acceptable steering wheel.

Figure 7:
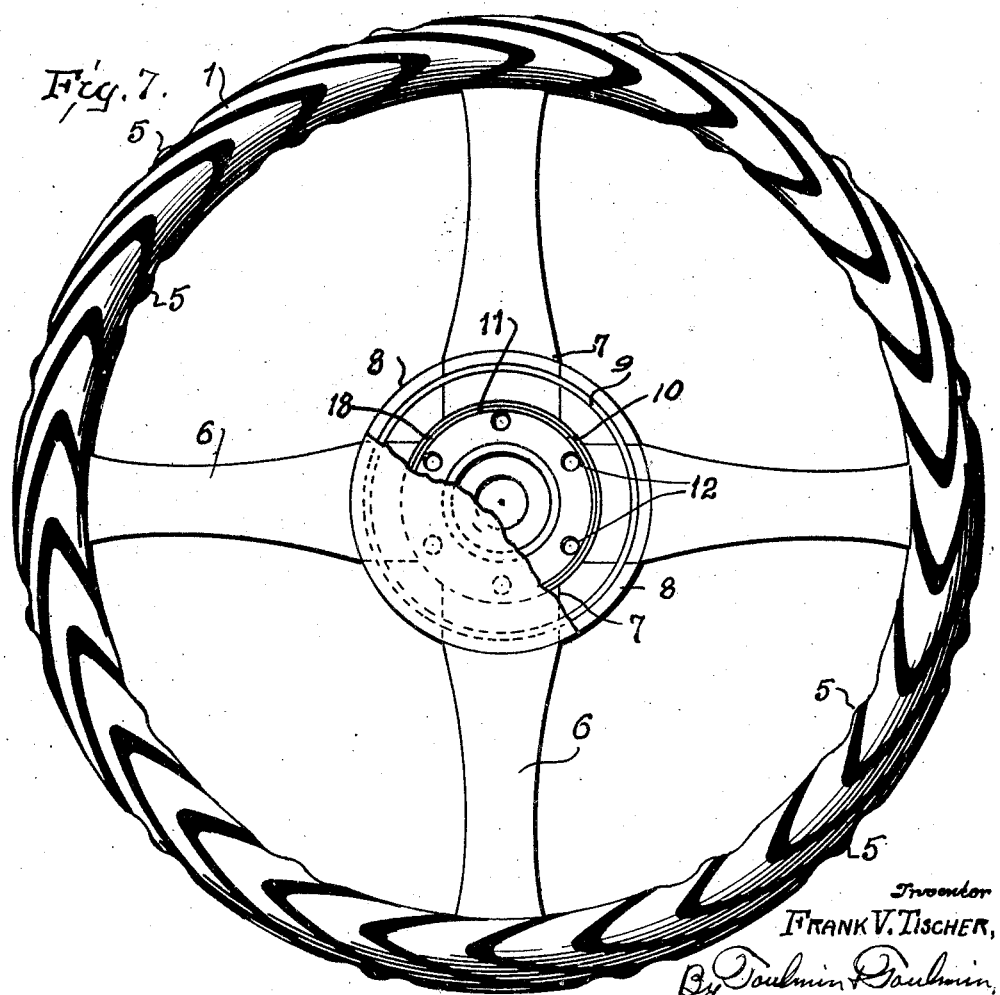
Fig. 7 is a plan view of my wheel illustrating the knuckles in staggered position on the outer and inner edges of the rim.

Referring now to Figs. 2 and 7, it will be observed from Fig. 7 that a part of the upper surface of the inner ends of the curved connecting arms and brace blocks are cut away, and a metal washer 11 inserted, the upper surface of the washer being flush with the remainder of the upper surface of the connecting arms and brace blocks constituting the hub. This metal washer carries a plurality of butt-bolts 12 which extend through holes in the inner ends of the connecting arms into a relatively heavy metal ring 13 overlapping the corresponding opposite surface of said connecting arms and brace blocks. The bolts 12 extend beyond the ring 13 and receive nuts 14 on their screw threaded ends 15, whereby the two metal rings 11 and 13 may be retained in close proximity to the upper and lower hub surfaces. These metal rings may comprise a part of the metal bushing for receiving the steering rod and thereby serve the dual function of securing the bushing to the wheel and reinforcing the wheel due to the fact that the rings are of sufficient width to permit the bolts to be anchored at a distance from the central bore 10. A suitable metal member 16 to conceal the nuts 14 and bolt ends 15 may be held in place against the lower surface of the hub in any suitable manner.

A suitable inlay 17 may be glued to the surface of the upper washer and the remainder of the wooden hub surface to provide a finish in keeping with the marquetry rim. In order to securely glue the inlay 17 to the washer I provide a groove 18, (Fig. 7) therein to contain glue or any desired retaining material.

In case a different style of bushing is used wherein the tightening nuts for the clamping bolts are placed on the top of the hub instead of the bottom, an inlay may be used to form a finish for, as well as strengthen, the joining of the brace blocks and connecting arm ends. In such cases, the reinforcing endless ring 9 may extend through such inlay and serve to add to the artistic finish of the wheel. This inlay may be laminated of two or more different colored woods if desired.

It will also be observed that a face veneer 19 of the desired wood may also be glued to the bottom of the hub to cover the joining of the brace blocks and connecting arm ends to correspond with the rest of the steering wheel.

The upper surface of the inclined portions of the connecting arms may also be inlaid with different colored wood to further ornament the wheel.

From the foregoing description and accompanying drawings it will be seen that I have provided a steering wheel which may be cheaply constructed and possess the necessary strength and rigidity to withstand strains and sudden stresses imposed thereon, which will afford an easy grip for the hand of the operator and a strong anchorage for the metal bushing; and which will also be artistic.

It will be understood that I desire to comprehend within my invention such modifications as will be necessary to adapt it to varying conditions and uses.

Having thus fully described my invention, what I claim as new and desire to secure by Letters Patent, is:—

1. In a wheel of the character described, a rim comprising a reinforcing central section having the grain of the wood running straight, outer sections secured to said central section and having the grain of the wood running at oblique angles thereto, a plurality of arms, and means for reinforcing said arms.

2. In a wheel of the character described, a rim, a plurality of arms secured to said rim at their outer ends and to one another at their inner ends, a plurality of brace blocks, means for firmly uniting said arms and brace blocks, and means for reinforcing the adjoining ends of said arms to prevent them being weakened by sudden jolts and stresses.

3. In a steering wheel of the character described, a rim comprising an intermediate reinforcing section having the grain of the wood running straight, outer sections secured to said intermediate section, one of said outer sections having the grain of the wood running at a right oblique angle to said intermediate section and the other outer section having the grain of wood running at a left oblique angle thereto, the composite structure being fashioned with knuckles in staggered relation on the outer and inner edges.

4. In a wheel of the character described, a rim, a plurality of arms secured to said rim at their outer ends and to one another at their inner ends, brace blocks secured between said arms adjacent their inner ends and forming with said arms a circular hub portion having a groove in one face, and a reinforcing member inserted in said groove.

5. In a wheel of the character described, a rim, a plurality of arms secured to said rim at their outer ends and to one another at their inner ends, brace blocks secured between said arms adjacent their inner ends and forming with said arms a circular hub portion having a groove in one face, a reinforcing member inserted in said groove, and means for reinforcing said arms.

6. In a wheel of the character described, a rim, a plurality of arms secured to said rim at their outer ends and to one another at their inner ends, brace blocks secured between said arms adjacent their inner ends and forming with said arms a circular hub, means for covering the upper and lower surfaces of said hub to provide a smooth artistic finish, and means for reinforcing said hub comprising an endless member inserted in said hub to tie said arms and brace blocks more firmly together.

7. In a wheel of the character described, a rim comprised of curved laminated segments arranged so that the grain of the wood of the structure will run at an oblique angle to a horizontal plane which is the plane of the wheel said segments being glued together.

8. In a wheel of the character described, a rim comprising an intermediate laminated structure having the grain of the wood running straight, a laminated structure adjacent one side of the intermediate structure and having the grain of the wood running at a left oblique angle thereto and another laminated structure adjacent the opposite side of the intermediate structure and having the grain of the wood running at a right oblique angle thereto, and a plurality of arms, all glued together.

9. In a steering wheel of the character described, a plurality of curved arms, a plurality of brace blocks, a plurality of laminated coverings, and a reinforcing ring for uniting said brace blocks and arms, all glued together.

10. In a steering wheel of the character described, a rim comprising a plurality of short, curved members laid about in stepped relationship to form circular sections, the grain of the wood running at an oblique angle to a horizontal plane which is the plane of the wheel.

11. In a steering wheel of the character described, a rim comprising two circular sections joined together, each section being formed of a plurality of short, curved members laid about in stepped relationship, the grain of the wood of one section running at a right oblique angle to the plane of the joining surface and the grain of the wood of the other section running at a left oblique angle to said plane.

12. In a steering wheel of the character described, a rim comprising a central reinforcing member, two circular sections secured to either side of said reinforcing member, each section being formed of a plurality of short, curved members laid about in stepped relationship, the grain of the wood of one section running at a right oblique angle to said reinforcing member and the grain of the wood of the other section running at a left oblique angle to said reinforcing member.

13. In a method of forming a steering wheel of the character described consisting of securing together a plurality of short, curved laminations to form a circular section, planing said formed circular section, joining together adjacent flat surfaces of two such planed sections so that the grain of the wood of one section will run at a right oblique angle to the plane of joining said sections and the grain of the wood of the other section will run at a left oblique angle to said plane.

In testimony whereof, I affix my signature.

FRANK V. TISCHER.